May 28, 1940. H. S. WILLSON 2,202,326
INTERNALLY FROSTED GLASS ARTICLE AND METHOD OF MAKING IT
Filed April 26, 1938
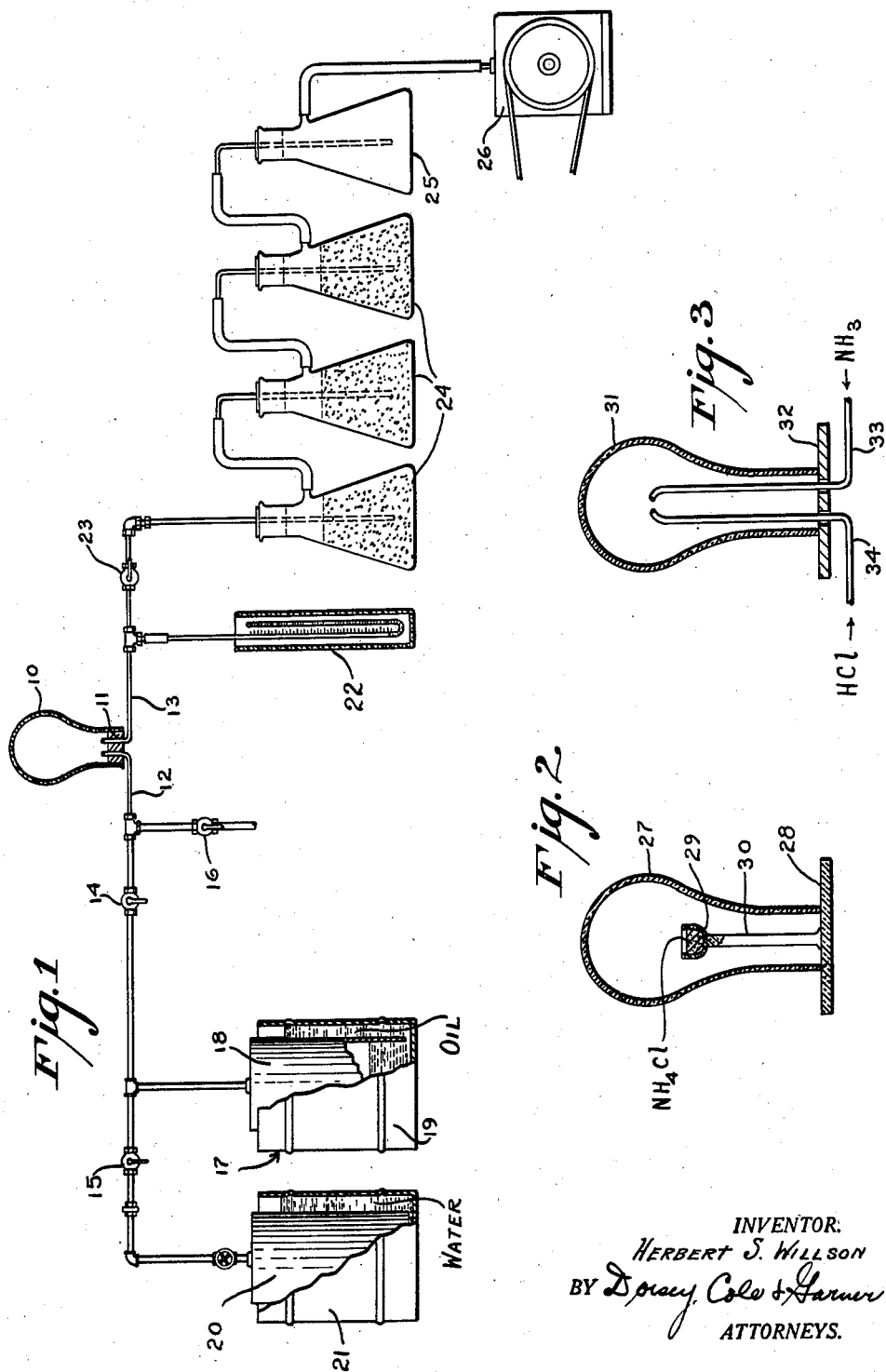
INVENTOR:
HERBERT S. WILLSON
BY Dorsey, Cole & Harner
ATTORNEYS.

Patented May 28, 1940

2,202,326

UNITED STATES PATENT OFFICE 2,202,326

INTERNALLY FROSTED GLASS ARTICLE AND METHOD OF MAKING IT

Herbert S. Willson, Corning, N. Y., assignor to Corning Glass Works, Corning, N. Y., a corporation of New York Application April 26, 1938, Serial No. 204,477

12 Claims. (Cl. 41—41)

This invention relates to the frosting of glass and more particularly to the inside frosting of hollow glass articles, such as lamp bulbs, by means of hydrofluoric acid.

The primary object of the invention is to produce a lamp bulb or other hollow glass article having a uniformly high light diffusion.

Another object is to produce such articles with a greater economy of time, materials, and equipment than has heretofore been possible.

With the above and other objects in view, the invention embodies among its features evacuating the glass article to an internal pressure which will support a column of mercury not higher than about four inches, admitting into the evacuated glass article a definite amount of gaseous hydrogen fluoride (HF) which is substantially free from air and thereafter removing the residual acid and gaseous products.

Another feature is a hollow glass article having on its inner surface a removable light diffusing layer composed of fluorides and chlorides of some of the constituents of the glass.

Other features of the invention will become apparent as the description proceeds and in order that the invention may be clearly understood reference is had to the accompanying drawing which illustrates but does not limit the invention and in which:

Fig. 1 is an elevation partly in section of an apparatus for frosting lamp bulbs in accordance with my invention;

Fig. 2 is an elevation partly in section of an apparatus for treating bulbs that have been frosted by my process; and Fig. 3 is a sectional view of a modification of the apparatus shown in Fig. 2.

It is to be understood that the drawing illustrates the simplest form of an apparatus for carrying out the process and many modifications in the construction, combination and arrangement of the parts will suggest themselves to one who is skilled in the art.

In Fig. 1 a bulb 10 to be frosted is supported in an inverted position on a rubber stopper 11 which is provided with two tubes or pipe lines 12 and 13 extending therethrough and communicating with the interior of the bulb. A plurality of bulbs may be employed if desired and interconnected by means of manifolds, but for simplicity only one is shown.

The line 12 in its outward extension is provided with valves 14 and 15 and a side arm and valve 16 which communicates with the open air. Between the valves 14 and 15 a branch of the line 12 communicates with a gas holder generally designated 17 which comprises an iron drum 18 having an open bottom and positioned within an open topped iron drum 19 which is filled with oil. Beyond the valve 15 the line 12 is connected with any convenient source of hydrofluoric acid gas, such as a steel bottle 20 containing substantially pure hydrogen fluoride, the bottle being immersed in a water bath 21 which can be heated, preferably by steam (not shown).

The line 13 in its outward extension is provided with a mercury manometer 22 and a valve 23 and is connected with a suitable absorption device which is the present embodiment takes the form of absorption bottles 24 containing soda lime or other suitable alkaline absorbent and an empty flask or safety trap 25, the latter being connected to a suitable vacuum pump 26.

In Fig. 2 a bulb 27 which has been frosted by my process is supported on a base 28 composed of acid resisting material such as glass. A cup 29 of similar material is supported on a stem or rod 30 attached to the base 28 and projecting upwardly within the bulb 27. The cup 29 contains a small amount of ammonium chloride.

In Fig. 3 a bulb 31 which has been frosted by my process is supported on a base 32 of acid resisting material through which tubes 33 and 34 project upwardly within the bulb. These tubes have open upper ends which are so positioned that when dry ammonia gas and dry hydrogen chloride respectively are passed through the tubes, as shown, the gases will mix within the bulb and form ammonium chloride.

In carrying the invention into practice the gas holder 17 is filled with gaseous hydrogen fluoride which may be accomplished in the following manner. With valves 15 and 16 closed and valves 14 and 23 open, the pressure in the line 12 is reduced until the air in the drum 18 is completely displaced by oil after which the valve 14 is closed and the valve 15 is opened for a sufficient length of time to permit gaseous hydrogen fluoride from the bottle 20 to displace the oil in the drum 18. Since the boiling point of hydrogen fluoride is about 19° C., it may be necessary or desirable, depending upon the temperature of the bottle and its contents, to heat the water bath 21 in order to obtain a suitable flow of gas. Subsequent fillings of the gas holder are accomplished merely by admitting gas from valve 15 while valve 14 is closed. In this way the gas is kept free from air and other diluents.

After the gas holder 17 has been filled with gas the valve 15 is closed and, with the valves 14 and 16 closed and the valve 23 open, the bulb 10 is evacuated preferably to an internal pressure not greater than four inches of mercury as shown by the manometer 22. The efficiency of the process depends largely upon the absence of air from the hydrogen fluoride, as will later appear, and the highest possible vacuum in the bulb is desirable at this stage. The bulb 10 having been evacuated, the valve 23 is closed and the valve 14 is opened to admit gaseous hydrogen fluoride into the bulb until the initial pressure therein has been increased by not less than six inches and not more than fifteen inches of mercury, depending upon certain considerations to be hereinafter set forth, and the valve 14 is again closed. After an interval of from two to six seconds, the valve 23 is again opened and the residual gas and gaseous reaction products are evacuated, whereupon the valve 16 is opened to relieve the vacuum and to sweep out any remaining gases and the frosted bulb is then removed. If desired, the final evacuation of the bulb may be omitted and the gases may be swept out simply by opening first the valve 16 and then the valve 23. In either case, the result is greatly improved if the air admitted through the valve 16 is preheated or somewhat warm.

By means of the above described process, a dense light-diffusing layer composed of fluorides of the glass constituents is deposited on the inner surface of the bulb in an even uniform coating. This coating is entirely different from the frost pattern produced by prior methods employing solutions containing hydrofluoric acid and fluorides. With the prior methods the surface of the glass is etched with innumerable microscopic crevices which cause diffusion of transmitted light. In the present method the surface of the glass per se remains visually unchanged but becomes coated with a light-diffusing layer of fluorides. This layer, although substantially adherent, may be rubbed or wiped off and may also be removed with a jet of water leaving the surface of the glass apparently unchanged. Bulbs, which for any reason have not taken a satisfactory frost, may have the coating removed and may thereupon be treated again by the same process. In this manner the poorly frosted bulbs may be reclaimed and refrosted thereby effecting a saving which is not always possible with prior methods.

Since a lamp bulb must undergo heating for the purpose of exhausting and sealing it when it is fabricated into a finished lamp, it is advantageous to bake the bulb after it has been frosted in order to remove volatile materials which might cause difficulty during subsequent fabrication of the lamp. For this purpose the frosted bulb is subjected to a temperature of about 400° C. in an oven for about ten minutes or for a time sufficient to remove such materials. During baking the density of the frost coating becomes somewhat less, due to volatilization of some of the constituents thereof.

It has been found that, if during baking the interior of the frosted bulb is subjected to the action of fumes of ammonium chloride, the density of the frost coating is increased and its adherence to the surface of the glass is improved. Fuming the frost coating with ammonium chloride results in the complete removal of silicon from the coating and a conversion of some of the fluorides to chlorides as is clearly shown by the following analyses of the coating from a bulb which has been baked without fuming and the coating of a bulb which had been baked at the same temperature for the same length of time while subjected to ammonium chloride fumes.

|  | Baked only | Baked with NH$_4$Cl |
|---|---|---|
| SiO$_2$ | 19.4 |  |
| R$_2$O$_3$ | 1.8 | 3.2 |
| Na$_2$O | 28.6 | 35.2 |
| CaO+MgO | 16.0 | 21.1 |
| F$_2$ | 55.1 | 21.4 |
| Cl$_2$ |  | 33.6 |
| NH$_3$ |  | Nil |
| Total | 120.9 | 114.5 |
| O$\rightleftharpoons$F$_2$ | −23.2 |  |
| O$\rightleftharpoons$F$_2$+Cl$_2$ |  | −16.5 |
|  | 97.7 | 98.0 |

The above analyses further show the distinction between bulbs which have been frosted by my process and those which have been frosted by prior methods. Prior frost coatings do not contain chlorides.

Fuming the frosted bulb with ammonium chloride may be accomplished by supporting a small amount of the salt within and out of contact with the bulb as shown in Fig. 2 while the bulb and its contents are heated in an oven at about 400° C. for above five minutes or for a length of time sufficient to volatilize all of the salt. Following this, heating is continued for about ten minutes to drive off remaining volatile materials. For better adherence it is desirable to have the fuming action start before the frost coating has been baked appreciably.

Alternatively the bulb may be fumed by passing into it dry HCl and dry NH$_3$ and permitting these gases to combine within the bulb as shown in Fig. 3 while the bulb is heated at about 400° C. for about five minutes followed by a ten minute baking as above.

The density, uniformity and adherence of the frost coating will depend upon the following considerations.

The presence of a substantial amount of air in the bulb during the reaction of the hydrogen fluoride will reduce the activity thereof and cause a streaked or spotted coating. For best results the initial pressure within the bulb should amount to not more than four inches of mercury before the gas is admitted.

The admission of too small an amount of hydrogen fluoride gas to the evacuated bulb will result in a thin frost coating of insufficient diffusibility and too large an amount of the gas will produce a thick and exceedingly dense coating which does not adhere satisfactorily to the glass. Since the density of the coating is decreased somewhat on baking and since the density will on the other hand be increased by fuming with ammonium chloride as pointed out above, the amount of gas used will depend upon the intended subsequent treatment of the bulb. Hence if the bulb is subsequently to be treated with ammonium chloride, less gas is required than if the bulb is to be baked only. In general, if the bulb after frosting is to be fumed with ammonium chloride, the amount of hydrogen fluoride admitted into the bulb should be sufficient to increase the pressure within the evacuated bulb by only six to ten inches of mercury but, if the bulb is to be baked only without fuming, the amount of hydrogen fluoride should be sufficient to raise the pressure by about ten to fifteen inches. The immediate and progressive formation of fluorides, some of which are not gaseous, causes a contraction in the volume of the gas as soon as it is admitted into the bulb and hence the admission should be swift and uniform and the manometer should be read quickly.

The temperature of the bulb, that is, the room temperature, at the time of frosting should be from 25° C to 28° C., because it has been found that, if the bulb is too cold, no frosting will occur, while, if too hot, the frost coating flakes off.

If a plurality of articles are to be frosted simultaneously they should be uniformly or evenly spaced from the manifold or source of hydrogen fluoride or otherwise arranged so that each article receives the same amount of gas. Neglect of this will result in non-uniformity of frost from one to another.

I claim:

1. The method of producing a light diffusing coating on the interior of a hollow glass article, which includes evacuating the article to an internal pressure which will support a column of mercury not higher than about four inches, admitting into the evacuated article a definite amount of gaseous hydrogen fluoride which is substantially free from air and other diluents and thereafter removing the residual acid and gaseous products.

2. The method of producing a light diffusing coating on the interior of a hollow glass article, which includes evacuating the article to an internal pressure which will support a column of mercury not higher than about four inches, admitting into the evacuated article a definite amount of gaseous hydrogen fluoride which is substantially free from air and other diluents and thereafter re-evacuating the article to remove the residual acid and gaseous products.

3. The method of producing a light diffusing coating on the interior of a hollow glass article, which includes evacuating the article to an internal pressure which will support a column of mercury not higher than about four inches, admitting into the evacuated article a definite amount of gaseous hydrogen fluoride which is substantially free from air and other diluents and thereafter sweeping out the residual acid and gaseous products with a current of air.

4. The method of producing a light diffusing coating on the interior of a hollow glass article, which includes evacuating the article to an internal pressure which will support a column of mercury not higher than about four inches, admitting into the evacuated article gaseous hydrogen fluoride which is substantially free from air and other diluents until the pressure within the bulb has increased by about six to fifteen inches of mercury, and thereafter removing the residual acid and gaseous products.

5. The method of producing a light diffusing coating on the interior of a hollow glass article, which includes evacuating the article to an internal pressure which will support a column of mercury not higher than about four inches, admitting into the evacuated article a definite amount of gaseous hydrogen fluoride which is substantially free from air and other diluents and thereafter removing the residual acid and gaseous products and baking the bulb for about ten minutes at about 400° C.

6. The method of producing a light diffusing coating on the interior of a hollow glass article, which includes evacuating the article to an internal pressure which will support a column of mercury not higher than about four inches, admitting into the evacuated article a definite amount of gaseous hydrogen fluoride which is substantially free from air and other diluents and thereafter removing the residual acid and gaseous products, subjecting the interior of the bulb to the action of ammonium chloride fumes, and at the same time heating it at about 400° C.

7. The method of producing a light diffusing coating on the interior of a hollow glass article, which includes evacuating the article to an internal pressure which will support a column of mercury not higher than about four inches, admitting into the evacuated article gaseous hydrogen fluoride which is substantially free from air and other diluents until the pressure within the bulb has increased by about 10–15 inches of mercury, and thereafter removing the residual acid and gaseous products and baking the bulb for about ten minutes at about 400° C.

8. The method of producing a light diffusing coating on the interior of a hollow glass article, which includes evacuating the article to an internal pressure which will support a column of mercury not higher than about four inches, admitting into the evacuated article gaseous hydrogen fluoride which is substantially free from air and other diluents until the pressure within the bulb has increased by about six to ten inches of mercury, and thereafter removing the residual acid and gaseous products, subjecting the interior of the bulb to the action of ammonium chloride fumes and at the same time heating it at about 400° C.

9. A hollow glass article having on its inner surface an anhydrous light diffusing coating containing fluorides and chlorides of some of the glass constituents.

10. A hollow glass article having on its inner surface an anhydrous, light diffusing coating composed of fluorides and chlorides of some of the glass constituents.

11. A hollow glass article having on its inner surface an anhydrous, light diffusing coating containing fluorides and chlorides of some of the glass constituents, said coating being removable by wiping.

12. A hollow glass article having on its inner surface an anhydrous, light diffusing coating containing fluorides and chlorides of some of the glass constituents, said coating being removable by wiping and the surface of the glass beneath the coating being substantially non-diffusing.

HERBERT S. WILLSON.